(12) United States Patent
Tanaka (10) Patent No.: US 8,531,563 B2
(45) Date of Patent: Sep. 10, 2013

(54) COLOR IMAGING APPARATUS

(75) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/560,431

(22) Filed: Jul. 27, 2012

(65) Prior Publication Data

US 2012/0293695 A1 Nov. 22, 2012

Related U.S. Application Data

(63) Continuation of application No. PCT/JP2011/067419, filed on Jul. 29, 2011.

(30) Foreign Application Priority Data

Feb. 28, 2011 (JP) .................................. 2011-042514
Jul. 25, 2011 (JP) .................................. 2011-162414

(51) Int. Cl.
*H04N 3/14* (2006.01)
*H04N 5/228* (2006.01)

(52) U.S. Cl.
USPC ......... 348/273; 348/222.1; 348/272; 348/280

(58) Field of Classification Search
USPC .............. 348/222.1, 266–280; 382/162, 299, 382/300
See application file for complete search history.

(56) References Cited

U.S. PATENT DOCUMENTS

| 6,091,862 A * | 7/2000 | Okisu ............................ 382/300 |
| 2004/0141072 A1 * | 7/2004 | Nilsson et al. ................ 348/272 |
| 2006/0203113 A1 | 9/2006 | Wada et al. |
| 2007/0153104 A1 | 7/2007 | Ellis-Monaghan et al. |
| 2007/0242875 A1 * | 10/2007 | Tanaka et al. ................. 382/162 |
| 2008/0151083 A1 | 6/2008 | Hains et al. |
| 2008/0291312 A1 * | 11/2008 | Egawa .......................... 348/308 |
| 2012/0025060 A1 | 2/2012 | Iwata |

FOREIGN PATENT DOCUMENTS

| JP | 8-23543 A | 1/1996 |
| JP | 2000-308080 A | 11/2000 |
| JP | 2004-266369 A | 9/2004 |
| JP | 2005-136766 A | 5/2005 |

(Continued)

OTHER PUBLICATIONS

ISR & Written Opinion in PCT/JP2012/080898 (English translation is attached).

(Continued)

*Primary Examiner* — Tuan Ho
*Assistant Examiner* — Akshay Trehan
(74) *Attorney, Agent, or Firm* — Birch, Stewart, Kolasch & Birch, LLP (57) ABSTRACT

A color imaging apparatus comprising: a single-plate color imaging element including color filters arranged on pixels arranged in horizontal and vertical directions where all colors are arranged in each line in the directions; weighted average filters with filter coefficients set in a local area extracted from a mosaic image acquired from the color imaging element corresponding to the weighted average filters so that proportions of sums of the filter coefficients of each color in the lines in the horizontal and vertical directions are equal; a weighted average calculation unit that calculates weighted average values of each color; a demosaicking processing unit that calculates a pixel value of another color at a pixel position of a target pixel of demosaicking processing and that interpolates a pixel value of the target pixel based on a color ratio or a color difference of the calculated weighted average values to calculate the pixel value.

20 Claims, 7 Drawing Sheets

(56) References Cited

FOREIGN PATENT DOCUMENTS

| | | |
|---|---|---|
| JP | 2006-229299 A | 8/2006 |
| JP | 2007-184904 A | 7/2007 |
| JP | 2007-288439 A | 11/2007 |
| JP | 2007-306490 A | 11/2007 |
| JP | 2008-28447 A | 2/2008 |
| JP | 2008-236620 A | 10/2008 |
| JP | 2008-289090 A | 11/2008 |
| JP | 2010-153511 A | 7/2010 |
| WO | WO 2008/066698 A2 | 6/2008 |

OTHER PUBLICATIONS

ISR & Written Opinion in PCT/JP2012/080899 (English translation is attached).
ISR & Written Opinion in PCT/JP2012/081644 (English translation is attached).
ISR & Written Opinion in PCT/JP2012/083583 (English translation is attached).
Chinese Office Action dated May 23, 2013 (English translation is attached).

* cited by examiner

A ARRAY

| 0 | 2 | 1 | 1 | 4 | 1 | 1 | 2 | 0 |
| 2 | 2 | 2 | 4 | 4 | 4 | 2 | 2 | 2 |
| 1 | 2 | 0 | 1 | 4 | 1 | 0 | 2 | 1 |
| 1 | 4 | 1 | 2 | 8 | 2 | 1 | 4 | 1 |
| 4 | 4 | 4 | 8 | 8 | 8 | 4 | 4 | 4 |
| 1 | 4 | 1 | 2 | 8 | 2 | 1 | 4 | 1 |
| 1 | 2 | 0 | 1 | 4 | 1 | 0 | 2 | 1 |
| 2 | 2 | 2 | 4 | 4 | 4 | 2 | 2 | 2 |
| 0 | 2 | 1 | 1 | 4 | 1 | 1 | 2 | 0 |

| G | G | R | B | G | G | R | B | G | G |
|---|---|---|---|---|---|---|---|---|---|
| R | B | G | 1 | 2 | 4 | 2 | 1 | 2 | B |
| G | G | B | 2 | 1 | 2 | 4 | 2 | 1 | G |
| B | R | G | 2 | 4 | 8 | 4 | 2 | 4 | R |
| G | G | R | 4 | 2 | 4 | 8 | 4 | 2 | G |
| R | B | G | 1 | 2 | 4 | 2 | 1 | 2 | B |
| G | G | B | 2 | 1 | 2 | 4 | 2 | 1 | G |
| B | R | G | G | B | R | G | G | B | R |

FIG.10 Prior Art

COLOR IMAGING APPARATUS

This application is a continuation application and claims the priority benefit under 35 U.S.C. §120 of PCT Application No. PCT/JP2011/067419 filed on Jul. 29, 2011 which application designates the U.S., and also claims the priority benefit under 35 U.S.C. §119 of Japanese Patent Applications No. 2011-042514 filed on Feb. 28, 2011 and No. 2011-162414 filed on Jul. 25, 2011, which applications are all hereby incorporated in their entireties by reference.

TECHNICAL FIELD

The present invention relates to a color imaging apparatus, and particularly, to a color imaging apparatus that can suppress generation of color moire.

BACKGROUND ART

In a color imaging apparatus including a single-plate color imaging element, an output image from the color imaging element is a RAW image (mosaic image). Therefore, a multi-channel image is obtained by a process of interpolating a pixel of a missing color from a surrounding pixel (demosaicing processing). In this case, there is a problem in reproduction characteristics of a high-frequency image signal.

A primary-color Bayer array as a color array most widely used in the single-plate color imaging element includes green (G) pixels arranged in a check pattern and red (R) and blue (B) arranged line-sequentially. Therefore, there is a problem of low-frequency coloring (color moire) caused by folding of high frequency signals exceeding reproduction bands of the colors and caused by deviation of phases of the colors.

Figure 10:
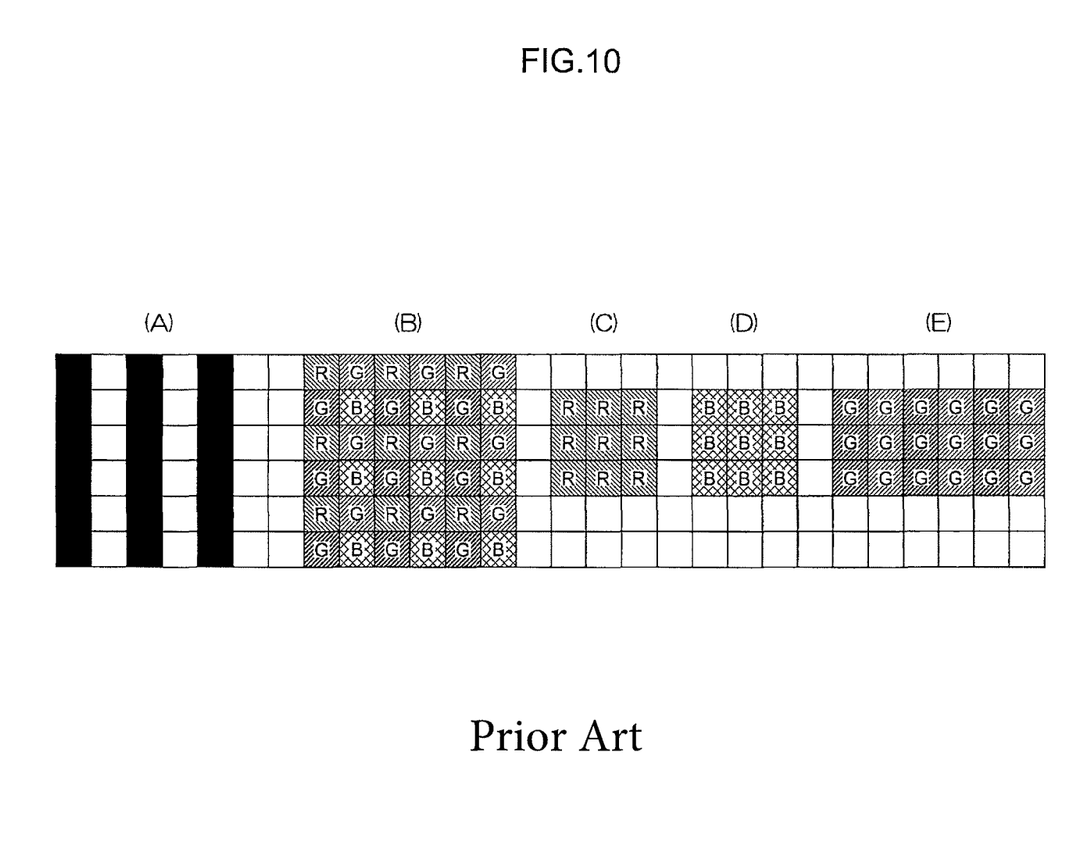
FIG. 10 is a diagram used to explain a problem of a conventional color imaging element with color filters in a Bayer array.

For example, a black and white vertical-striped pattern (high frequency image) as shown in FIG. 10(A) enters an imaging element in a Bayer array shown in FIG. 10(B), and the pattern is sorted into Bayer color arrays to compare the colors. As shown in FIGS. 10(C) to 10(E), R forms a light and flat color image, B forms a dark and flat color image, and G forms a light and dark mosaic color image. Although there is no density difference (level difference) between RGB with respect to the original black and white image, the image is colored depending on the color array and the input frequency.

In the color imaging apparatus using the single-plate color imaging element, an optical low-pass filter formed by an anisotropic substance such as crystal is generally arranged on the front side of the color imaging element to prevent optically reducing the high frequency wave. However, although the coloring caused by folding of the high frequency signal can be reduced in the method, there is a problem that the resolution is reduced accordingly.

To solve the problem, a color imaging element is proposed, wherein a color filter array of the color imaging element is a three-color random array satisfying array restrictions in which an arbitrary target pixel is adjacent to three colors including the color of the target pixel on four sides of the target pixel (PTL 1).

An image sensor of a color filter array is also proposed, wherein the image sensor includes a plurality of filters with different spectral sensitivity, and first and second filters among the plurality of filters are alternately arranged in a first predetermined period in one of the diagonal directions of a pixel grid of the image sensor and are alternately arranged in a second predetermined period in the other diagonal direction (PTL 2).

Furthermore, an image apparatus including a color imaging element is also proposed, wherein R and B among the three primary colors of RGB are arranged every three pixels in horizontal and vertical directions, and G is arranged between R and B (PTL 3). In the color imaging element described in PTL 3, G pixels that most contribute to obtaining luminance signals are arranged much more than RB pixels, on the ground that the resolution of color difference signals can be lower than the resolution of the luminance signals. This can increase the resolution in the horizontal and vertical directions.

CITATION LIST

Patent Literature

{PTL 1}
Japanese Patent Application Laid-Open No. 2000-308080
{PTL 2}
Japanese Patent Application Laid-Open No. 2005-136766
{PTL 3}
Japanese Patent Application Laid-Open No. 8-23543

SUMMARY OF INVENTION

Technical Problem

The three-color random array described in PTL 1 is effective for low-frequency color moire, but is not effective for a false color of a high frequency section.

Meanwhile, in the color filter array of the image sensor described in PTL 2, the R, G, and B filters are periodically arranged in the lines in the horizontal and vertical directions of the color filter array. In demosaicing processing of a mosaic image output from the image sensor including the color filter array in the invention described in PTL 2, a local area in a predetermined image size is extracted around the target pixel, statistics related to a color distribution shape of the color of the target pixel in the local area and a color distribution shape of another color to be estimated are calculated, and the color distribution shapes are linearly regressed based on the intensity of the colors at the target pixel position and the statistics of the color distribution shapes to thereby calculate an estimation value of the another color at the target pixel position. The calculation of the statistics (covariance values) related to the color distribution shapes and the regression calculation process are necessary in the invention described in PTL 2, and there is a problem that the image processing is complicated.

The color imaging element described in PTL 3 includes lines with only G pixels in the horizontal or vertical direction. Therefore, the color imaging element is not effective for the false color of a high frequency section in the horizontal or vertical direction.

The present invention has been made in view of the circumstances, and an object of the present invention is to provide a color imaging apparatus that can suppress generation of a false color of a high frequency section by simple image processing.

Solution to Problem

To attain the object, an invention according to an aspect of the present invention includes a color imaging apparatus including: a single-plate color imaging element including color filters arranged on a plurality of pixels formed by photoelectric conversion elements arranged in horizontal and vertical directions, the color filters having a color filter array where all colors are periodically arranged in each line in the horizontal and vertical directions; an image acquisition unit that acquires a mosaic image from the color imaging element; weighted average filters with predetermined filter coefficients, wherein a relationship between the colors of the pixels and the filter coefficients in a local area extracted from the mosaic image corresponding to the weighted average filters is set so that proportions of sums of the filter coefficients of each color in the lines in the horizontal and vertical directions are equal; a weighted average calculation unit that calculates weighted average values of each color based on the filter coefficients of the weighted average filters and pixel values of the pixels in the local area extracted from the mosaic image corresponding to the weighted average filters; a demosaicing processing unit that calculates a pixel value of another color at a pixel position of a target pixel of demosaicing processing at a center section of the weighted average filters and that interpolates a pixel value of the target pixel based on a color ratio or a color difference between the calculated weighted average values of the color and the another color of the target pixel to calculate the pixel value of the another color; and a control unit that repeatedly operates the weighted average calculation unit and the demosaicing processing unit while shifting the local area extracted from the mosaic image corresponding to the weighted average filters by a target pixel unit of the demosaicing processing.

According to the color imaging apparatus of the aspect of the present invention, the single-plate color imaging element including the color filters of all colors in the color filter array periodically arranged in the lines in the horizontal and vertical directions is used. Therefore, the filter coefficients for the colors of the pixels in the local area extracted from the mosaic image corresponding to the weighted average filters can be set so that the proportions of the sums of the filter coefficients of each color in the lines in the horizontal and vertical directions are equal.

The proportions of the sums of each color are equal in any line in the horizontal and vertical directions in the filter coefficients of the weighted average filters. Therefore, regardless of the type of the frequency input in the horizontal and vertical directions, the relationship between the colors as a result of the application of the filter coefficients is not fluctuated, and coloring due to folding of the high frequency wave does not occur. More specifically, the weighted average values of each color calculated based on the filter coefficients of the weighted average filters and the pixel values of the pixels in the local area extracted from the mosaic image corresponding to the weighted average filters indicate accurate colors in the local area regardless of the type of the frequency input in the horizontal and vertical directions in the local area. Therefore, in the calculation of the pixel value of another color at the pixel position of a target pixel of demosaicing processing at a center section of the weighted average filters, the pixel value of the target pixel can be interpolated based on a color ratio or a color difference of the calculated weighted average values to accurately estimate the pixel value of the another color.

In the color imaging apparatus according to another aspect of the present invention, the color filter array of the color imaging element includes a basic array pattern including first filters corresponding to a first color that most contributes to obtaining luminance signals and second filters corresponding to two or more second colors other than the first color, the basic array pattern is repeatedly arranged in the horizontal and vertical directions, and a proportion of the number of pixels of the first color corresponding to the first filters and proportions of the numbers of pixels of each color of the second colors corresponding to the second filters are different. More specifically, even if the proportion of the number of pixels of the first color corresponding to the first filter and the proportions of the numbers of pixels of each color of the second colors corresponding to the second filters are different, the proportions of the sums of the filter coefficients of each color are equal in any line in the horizontal and vertical directions in the filter coefficients of the weighted average filters. Therefore, the relationship between the colors as a result of the application of the filter coefficients is not fluctuated, and coloring due to folding of the high frequency wave does not occur.

Preferably, in the color imaging apparatus according to another aspect of the present invention, the proportion of the number of pixels of the first color corresponding to the first filters is greater than the proportions of the numbers of pixels of each color of the second colors corresponding to the second filters. The proportion of the number of pixels of the first color that most contributes to obtaining the luminance signals is greater than the proportions of the numbers of pixels of each color of the second colors corresponding to the second filters. Therefore, aliasing can be suppressed, and high frequency wave reproducibility is excellent.

Preferably, in the color imaging apparatus according to another aspect of the present invention, the weighted average filters are filters weighted to increase the filter coefficients at the center section. As a result, the colors at the pixel positions of the target pixels of the demosaicing processing can be accurately obtained.

Preferably, in the color imaging apparatus according to another aspect of the present invention, the weighted average filters have the filter coefficients that are horizontally symmetric, vertically symmetric, and point symmetric. As a result, in the calculation of the weighted averages of each color by extracting the local area from the mosaic image, the same weighted average filters can be used even if the extracted local area is shifted.

In the color imaging apparatus according to another aspect of the present invention, the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G\times(Rf/Gf)$ and $B=G\times(Bf/Gf)$, wherein if the target pixel of the demosaicing processing is an R pixel, and the pixel value is R, the demosaicing processing unit calculates pixel values G and B of the G and B pixels at the position of the target pixel by the following formulas $G=R\times(Gf/Rf)$ and $B=R\times(Bf/Rf)$, wherein if the target pixel of the demosaicing processing is a B pixel, and the pixel value is B, the demosaicing processing unit calculates pixel values G and R of the G and R pixels at the position of the target pixel by the following formulas $G=B\times(Gf/Bf)$ and $R=B\times(Rf/Bf)$.

The ratio of the weighted average values (Rf, Gf, Bf) of each color in the local area indicates the ratio (color ratio) of RGB of the original colors at the pixel position of the target pixel in the local area. The pixel value at the position of the target pixel can be interpolated based on the color ratio to accurately estimate the pixel value of another color.

In the color imaging apparatus according to another aspect of the present invention, the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

The difference between the weighted average values (Rf, Gf, Bf) of each color in the local area indicates the difference (color difference) between RGB of the original colors at the pixel position of the target pixel in the local area. The pixel value at the position of the target pixel can be interpolated based on the color difference to accurately estimate the pixel value of another color.

In the color imaging apparatus according to another aspect of the present invention, the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

The first and second arrays include vertically and horizontally symmetric color filters, and just the R and B filters are switched between the first and second arrays. Therefore, in the processing while shifting the weighted average filters by 3×3 pixels, the proportions of the sums of the filter coefficients of each color in the lines in the horizontal and vertical directions can be equal without changing the filter coefficients of the weighted average filters.

Advantageous Effects of Invention

According to the present invention, the filter coefficients for the colors of the pixels in the local area extracted from the mosaic image corresponding to the weighted average filters are set so that the proportions of the sums of the filter coefficients of each color in the lines in the horizontal and vertical directions are equal, and the weighted average values of each color are calculated based on the filter coefficients of the weighted average filters and the pixel values of the pixels in the local area extracted from the mosaic image corresponding to the weighted average filters. Therefore, the color ratio or the color difference of the weighted average values of each color in the local area indicates the color ratio or the color difference of the original colors at the pixel position of the target pixel of the local area. As a result, the pixel value of another color can be accurately estimated by interpolating the pixel value of the target pixel based on the color ratio or the color difference of the calculated weighted average values.

The color ratio or the color difference of the weighted average values of each color in the local area does not change regardless of the type of the frequency input in the horizontal and vertical directions in the local area. Therefore, false determination of color does not occur, and generation of a false color of a high frequency section can be suppressed. The pixel value of another color can be estimated by simple calculation of weighted average and interpolation.

DESCRIPTION OF EMBODIMENTS

Hereinafter, preferred embodiments of a color imaging apparatus according to the present invention will be described in detail with reference to the attached drawings.

{Overall Configuration of Color Imaging Apparatus}

Figure 1:
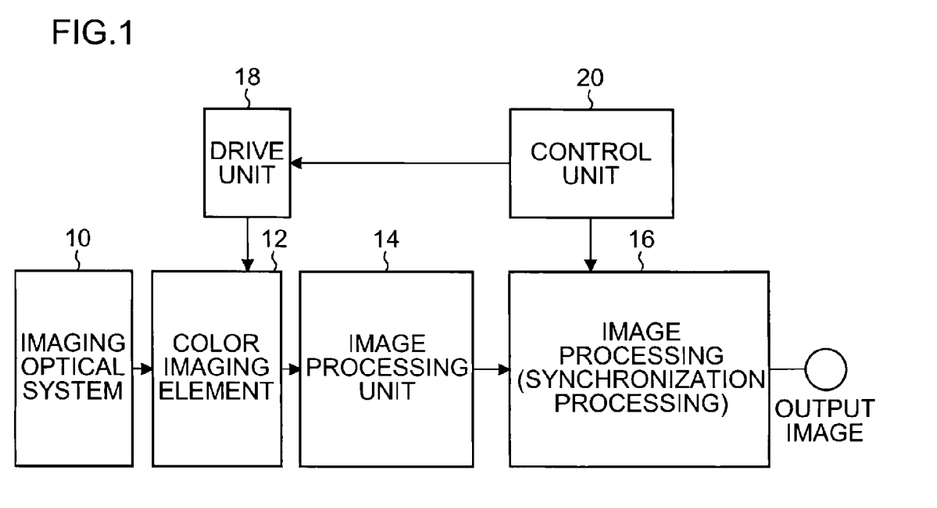
FIG. 1 is a block diagram showing embodiments of a color imaging apparatus according to the present invention.

FIG. 1 is a block diagram showing embodiments of the color imaging apparatus according to the present invention.

An imaging optical system 10 images a subject, and an optical image indicating a subject image is formed on a light receiving surface of a color imaging element 12 (color imaging element of a first embodiment).

The color imaging element 12 is a single-plate color imaging element including: a plurality of pixels (not shown) including photoelectric conversion elements arranged in horizontal and vertical directions (two-dimensional array); and color filters in a predetermined color filter array arranged on light receiving surfaces of the pixels. The color filter array of the color imaging element 12 is characterized by including the filters of all colors of red (R), green (G), and blue (B) periodically arranged in the lines in the horizontal and vertical directions. The details will be described later.

The photoelectric conversion elements convert the subject image formed on the color imaging element 12 to signal charges corresponding to amounts of incident light. The signal charges accumulated on the photoelectric conversion elements are sequentially read out from the color imaging element 12 as voltage signals (image signals) corresponding to the signal charges based on drive pulses provided from a drive unit 18 according to an instruction of a control unit 20. The image signals read out from the color imaging element 12 are R, G, and B signals indicating a mosaic image of R, G, and B corresponding to the color filter array of the color imaging element 12. The color imaging element 12 is not limited to a CCD (Charge Coupled Device) color imaging element and may be another type of imaging element such as a CMOS (Complementary Metal Oxide Semiconductor) imaging element.

The image signals read out from the color imaging element 12 are input to an image processing unit 14. The image processing unit 14 includes: a correlated double sampling circuit (CDS) that removes reset noise included in the image signals; an AGC circuit that amplifies the image signals and controls the size at a certain level; and an A/D converter. The image processing unit 14 applies a correlated double sampling process to the input image signals and amplifies the image signals, and then outputs RAW data, which is formed by converting the image signals to digital image signals, to the image processing unit 16.

The image processing unit 16 includes a white balance correction circuit, a gamma correction circuit, a demosaicing processing circuit according to the present invention (processing circuit that calculates (converts to synchronous system) all color information of RGB of the pixels from the mosaic image of RGB associated with the color filter array of the single-plate color imaging element 12), a luminance/color difference signal generation circuit, a contour correction circuit, a color correction circuit, and the like. According to an instruction from the control unit 20, the image processing unit 16 applies required signal processing to the RAW data of the mosaic image input from the image processing unit 14 to generate image data (YUV data) including luminance data (Y data) and color difference data (Cr, Cb data).

For still images, a compression/expansion processing circuit applies a compression process, which is compliant with a JPEG standard, to the image data generated by the image processing unit 16. For moving images, the compression/expansion processing circuit applies a compression process, which is compliant with an MPEG2 standard, to the image data. The image data is recorded in a recording medium (memory card) and is output and displayed on a display device (not shown) such as a liquid crystal monitor.

Details of the processing by the demosaicing processing circuit according to the present invention in the image processing unit 16 will be described later.

<Features of Color Filter Array>

Figure 2:
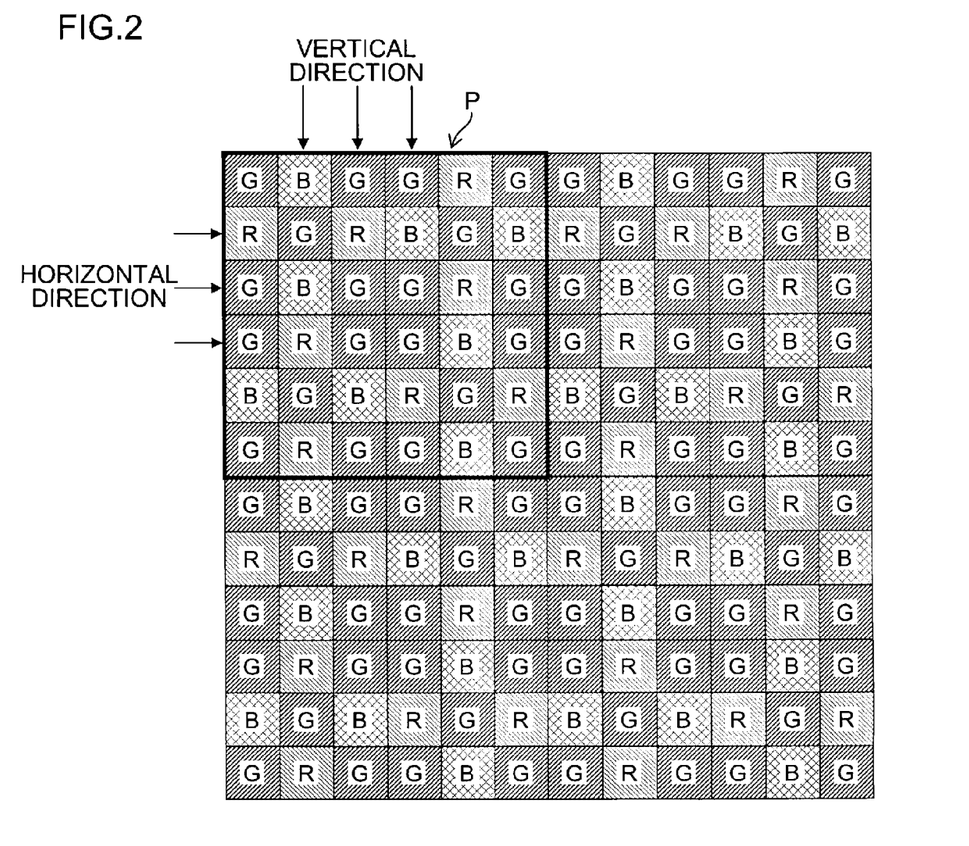
FIG. 2 is a diagram showing a color filter array of color filters arranged on the color imaging element of a first embodiment.

The color filter array of the color imaging element 12 has the following features (1), (2), and (3).

{Feature (1)}

FIG. 2 is a diagram showing the color filter array of the color filters arranged on the color imaging element 12. As shown in FIG. 2, the color filter array of the color imaging element 12 includes a basic array pattern P (pattern indicated by a thick frame) formed by a square array pattern corresponding to 6×6 pixels, and the basic array pattern P is repeatedly arranged in the horizontal and vertical directions. Therefore, the color filter array includes filters of R, G, and B colors (R filters, G filters, and B filters) arranged in a predetermined cycle.

In this way, the R filters, the G filters, and the B filters are arranged in a predetermined cycle. Therefore, the demosaicing processing and the like of the R, G, and B signals read out from the color imaging element 12 can be processed according to the repeated pattern.

{Feature (2)}

In the color filter array shown in FIG. 2, the filters of all colors of R, G, and B are arranged in the lines in the horizontal and vertical directions.

Figure 3:
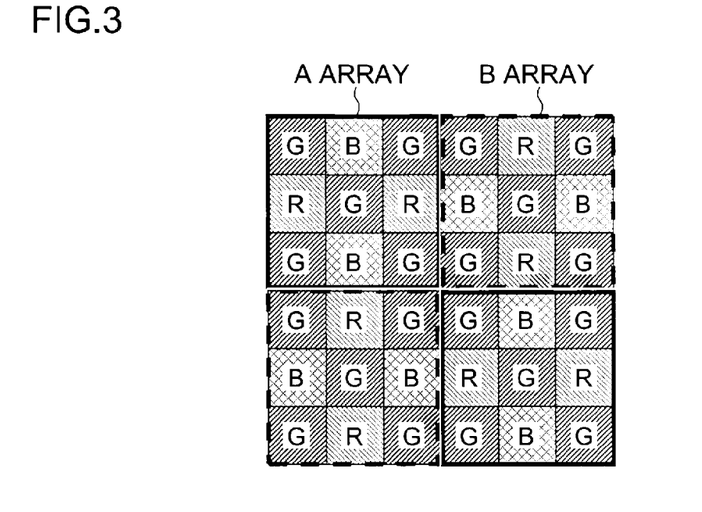
FIG. 3 is a diagram showing a basic array pattern included in the color filter array of the color imaging element of the first embodiment.

FIG. 3 shows a state in which the basic array pattern P shown in FIG. 2 is divided into four sets of 3×3 pixels.

Figure 4:
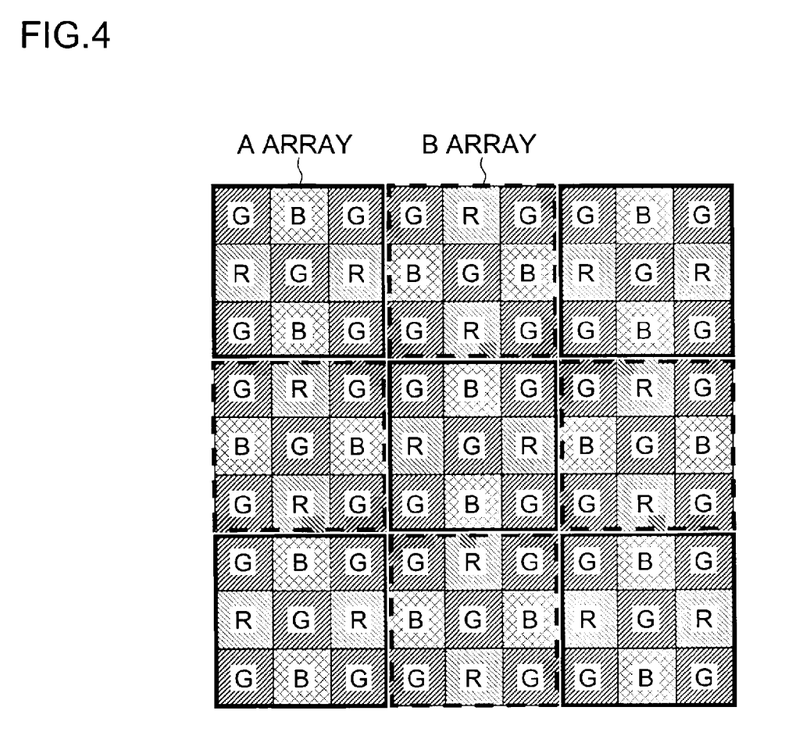
FIG. 4 is a diagram showing a state in which the basic array pattern of 6×6 pixels included in the color filter array of the color imaging element of the first embodiment is divided into A arrays and B arrays of 3×3 pixels, and the A arrays and the B arrays are arranged.

As shown in FIG. 3, the basic array pattern P can be perceived as a pattern including A arrays of 3×3 pixels surrounded by a frame of solid lines and B arrays of 3×3 pixels surrounded by a frame of broken lines alternately arranged in the horizontal and vertical directions as shown in FIG. 4.

Each of the A and B arrays includes G filters as luminance pixels arranged at four corners and a center, and the G filters are arranged on both diagonals. In the A array, the R filters are arranged in the horizontal direction, and the B filters are arranged in the vertical direction, across the G filter at the center. Meanwhile, in the B array, the B filters are arranged in the horizontal direction, and the R filters are arranged in the vertical direction, across the G filter at the center. Therefore, although the positional relationship between the R and B filters is opposite in the A and B arrays, the rest of the arrangement is the same.

{Feature (3)}

The basic array pattern of the color filter array shown in FIG. 2 is point symmetric with respect to the center (center of four G filters) of the basic array pattern. As shown in FIG. 3, the A arrays and the B arrays in the basic array pattern are also point symmetric with respect to the G filters at the centers.

{Feature (4)}

In the basic array pattern of the color filter array shown in FIG. 2, the numbers of pixels of the R pixels, the G pixels, and the B pixels corresponding to the R, G, and B filters in the basic array pattern are eight pixels, twenty pixels, and eight pixels, respectively. More specifically, the ratio of the numbers of pixels of the RGB pixels is 2:5:2, and the proportion of the number of pixels of the G pixels that most contribute to obtaining the luminance signals is greater than the proportions of the numbers of pixels of the R and B pixels of the other colors.

{Weighted Average Filters Used in Demosaicing Processing Circuit of Image Processing Unit 16}

Figure 5:
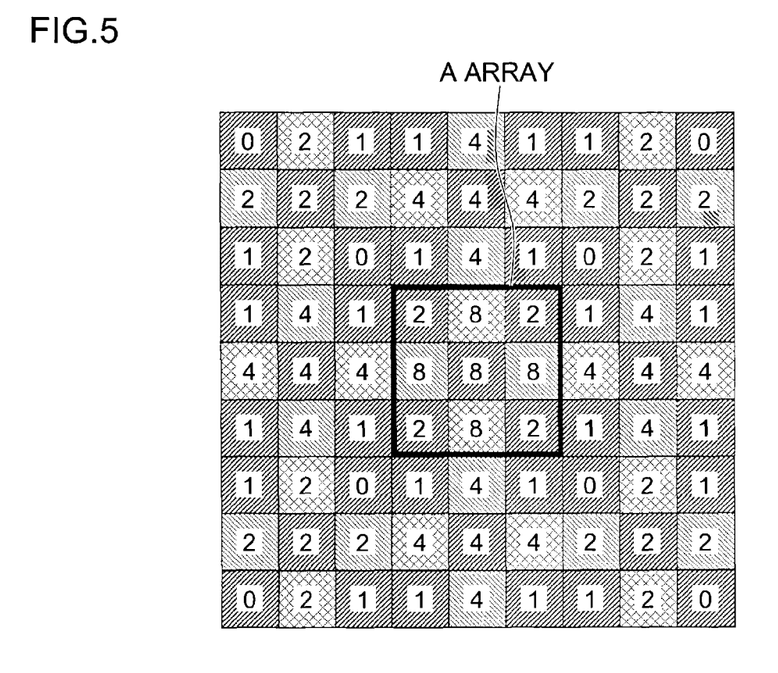
FIG. 5 is a diagram showing weighted average filters applied to the color imaging element of the first embodiment.

FIG. 5 is a diagram showing an embodiment of weighted average filters used in the demosaicing processing circuit of the image processing unit 16. FIG. 5 particularly shows filter coefficients of the weighted average filters.

As shown in FIG. 5, the weighted average filters (weighted average filters of the first embodiment) have a kernel size of 9×9, and filter coefficients shown in FIG. 5 are set.

More specifically, for the filter coefficients of the weighted average filters, a local area of 9×9 pixels is extracted from the mosaic image obtained from the color imaging element 12 so that the A array is at the center. The filter coefficients of each color are extracted corresponding to the colors of the pixels in the local area, and the sums of the filter coefficients of each color are calculated. The filter coefficients are set so that the proportions of the sums of the filter coefficients of each color of RGB in the lines in the horizontal and vertical directions are equal (1:1:1).

For example, the filter coefficients of the uppermost row are 0, 2, 1, 1, 4, 1, 1, 2, and 0 in FIG. 5. It can be recognized that the sums of the colors are R=4, G=0+1+1+1+1+0=4, and B=2+2=4, and the sums are in a relationship of 4:4:4=1:1:1. The relationship holds true for all rows and columns (lines in the horizontal and vertical directions) in the filter coefficients.

The filter coefficients are weighted in the weighted average filters so that when the filter coefficients are compared in each area divided into the size of 3×3, the filter coefficient of 3×3 at the center section is the largest, the vertical and horizontal filter coefficients of 3×3 across the center section are the next largest, and the filter coefficients of 3×3 at the four corners are the smallest.

The filter coefficients are set in the weighted average filters so that the filter coefficients are horizontally symmetric, vertically symmetric, and point symmetric.

When weighted average values of RGB are calculated based on the weighted average filters with the configuration described above and based on the pixel values of the pixels in the local area of 9×9 pixels extracted from the mosaic image, color deviation does not occur in the colors based on the weighted average values of RGB regardless of the type of the frequency input in the horizontal and vertical directions, and coloring due to the folding of the high frequency wave does not occur.

Figure 6A:
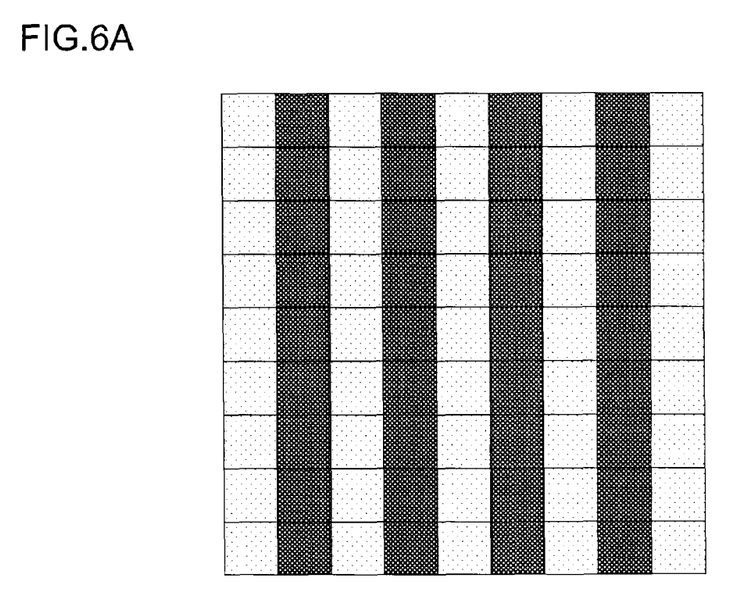
FIG. 6A is a diagram showing an image when a vertical-striped high frequency wave is input.
Figure 6B:
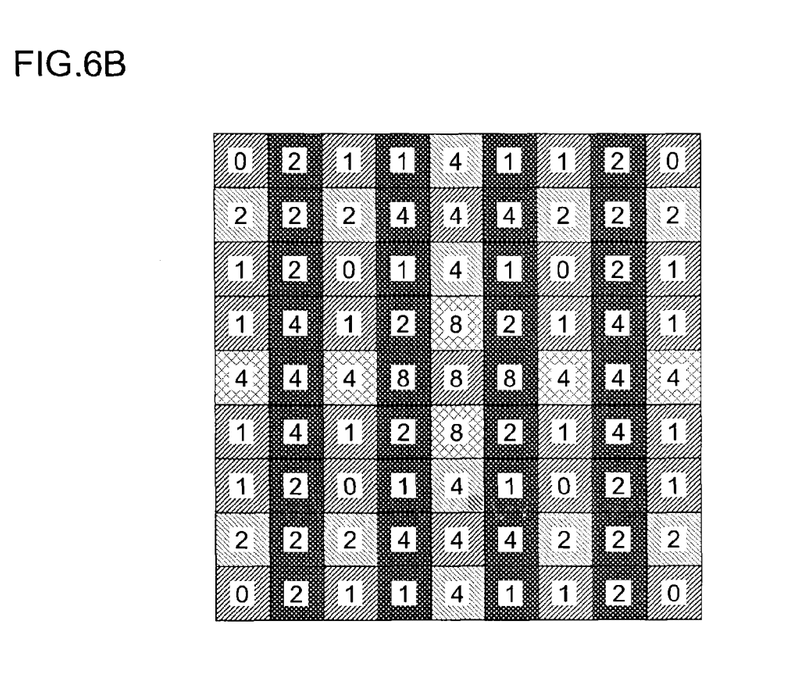
FIG. 6B is a diagram used to explain that there is no color deviation in colors of weighted average values applied with the weighted average filters when a vertical-striped high frequency wave is input.

For example, when a vertical-striped high frequency wave shown in FIG. 6A is input, the sums of the filter coefficients of each color are 32:32:32 (see FIG. 6B), and it can be recognized from the color ratio that the image is black and white.

{Demosaicing Processing by Demosaicing Processing Circuit of Image Processing Unit 16}

A method of applying demosaicing processing to the mosaic image of RGB by the demosaicing processing circuit of the image processing unit 16 will be described.

As shown in FIG. 5, a local area of 9×9 pixels is extracted from the mosaic image obtained from the color imaging element 12 so that the A array is at the center. The weighted average values of each color of RGB are calculated based on the pixel values of the pixels in the local area and the filter coefficients of the weighted average filters. More specifically, the pixel values of the pixels in the local area are multiplied by the filter coefficients of the weighted average filters at the pixel positions. The results of multiplication are added color by color to calculate the sums of the colors, and the sums of the colors are further divided by 64 to calculate the weighted average values. The number 64 is a sum of the filter coefficients of RGB of the weighted average filters.

Proportions (color ratio) of the weighted average values of RGB are calculated from the calculated weighted average values of RGB. 3×3 pixels (pixels in a thick frame shown in FIG. 5) at the center section in the local area of 9×9 pixels are set as target pixels of the demosaicing processing, and the pixel values at the pixel positions of the target pixels are interpolated by the calculated color ratio to calculate the pixel values of the other values at the pixel positions.

Specifically, when the calculated weighted average values of each color of RGB are Rf, Gf, and Bf, the target pixel of the demosaicing processing is a G pixel, and the pixel value is G, pixel values R and B at the position of the target pixel are calculated by the following formulas.

$$R = G \times (Rf/Gf), B = G \times (Bf/Gf) \tag{1}$$

Similarly, when the target value of the demosaicing processing is an R pixel, and the pixel value is R, pixel values G and B of the G and B pixels at the position of the target pixel are calculated by the following formulas.

$$G = R \times (Gf/Rf), B = R \times (Bf/Rf) \tag{2}$$

When the target pixel of the demosaicing processing is a B pixel, and the pixel value is B, pixel values G and R of the G and R pixels at the position of the target pixel are calculated by the following formulas.

$$G = B \times (Gf/Bf), R = B \times (Rf/Bf) \tag{3}$$

When the demosaicing processing for calculating the pixel values of RGB is finished for all pixels of 3×3 pixels at the center section in the local area of 9×9 pixels, the same process is applied while shifting the local area extracted from the mosaic image by 3×3 pixels.

If the local area of 9×9 pixels is shifted by three pixels in the horizontal or vertical direction from the state shown in FIG. 5, the B array of 3×3 pixels is positioned at the center section of the local area of 9×9 pixels after the shift (see FIG. 4). As described, the arrangements of the G filters are the same in the A and B arrays, and only the positions of the R and B filters are different. Meanwhile, the same values are allocated to the filter coefficients at the positions corresponding to the R filters and at the positions corresponding to the B filters in the weighted average filters. Therefore, the same weighted average filters can be used when the demosaicing processing is executed while shifting the local area.

The filter coefficients are set so that the proportions of the sums of the filter coefficients of each color of RGB in the lines in the horizontal and vertical directions are equal. Therefore, if the weighted average values of RGB are calculated based on the weighted average filters when the weighted average filters are applied to the mosaic image of RGB obtained from the color imaging element 12, the colors of the local area based on the weighted average values of RGB can be accurately indicated regardless of the type of the frequency input in the horizontal and vertical directions. The demosaicing processing is executed based on the colors from the weighted average values of RGB, and the generation of the false color can be controlled. As a result, it is possible not to arrange an optical low-pass filter for controlling the generation of the false color on an optical path from a plane of incident to an imaging plane of the optical system. Even if the optical low-pass filter is applied, a filter with less effect of cutting high frequency components for preventing the generation of the false color can be applied, and a loss of resolution can be prevented.

In the embodiment, the pixel value at the pixel position of the target pixel is interpolated based on the color ratio of the weighted average values of RGB to calculate the pixel values of the other colors at the target position. However, the arrangement is not limited to this, and the pixel value of the target pixel can be interpolated based on the color difference between the weighted average values of RGB to calculate the pixel values of the other colors.

Specifically, when the weighted average values of each color of RGB are Rf, Gf, and Bf, the target pixel of the demosaicing processing is a G pixel, and the pixel value is G, pixel values R and B at the position of the target pixel are calculated by the following formulas.

$$R = G + (Rf - Gf), B = G + (Bf - Gf) \quad (4)$$

Similarly, when the target pixel of the demosaicing processing is an R pixel, and the pixel value is R, pixel values G and B of the G and B pixels at the position of the target pixel are calculated by the following formulas.

$$G = R + (Gf - Rf), B = R + (Bf - Rf) \quad (5)$$

When the target pixel of the demosaicing processing is a B pixel, and the pixel value is B, pixel values G and R of the G and R pixels at the position of the target pixel are calculated by the following formulas.

$$G = B + (Gf - Bf), R = B + (Rf - Bf) \quad (6)$$

{Second Embodiment of Color Imaging Element and Weighted Average Filters}

Figure 7:
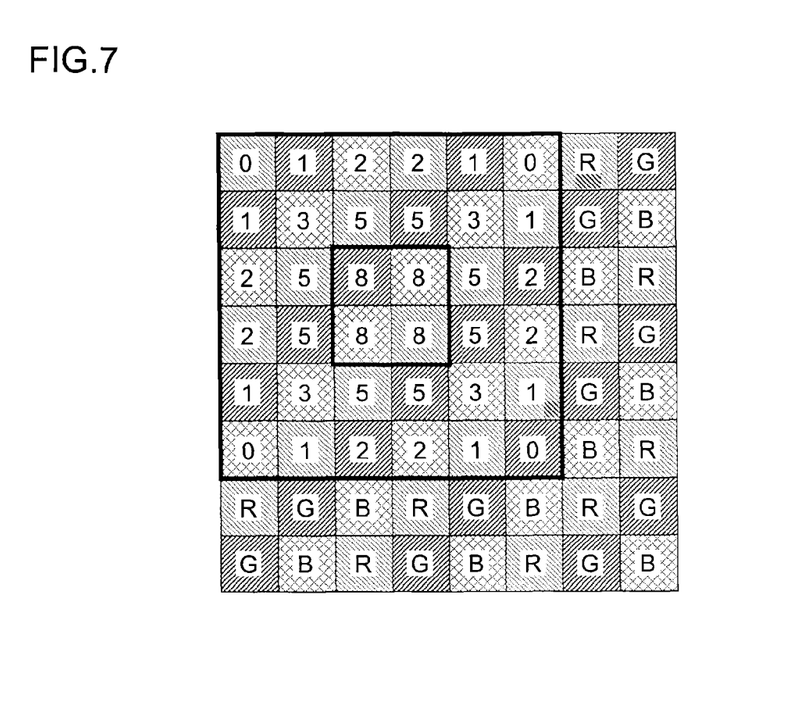
FIG. 7 is a diagram showing a second embodiment of the color imaging element and the weighted average filters applied to the present invention.

FIG. 7 is a diagram showing a second embodiment of the color imaging element and the weighted average filters applied to the present invention. FIG. 7 particularly shows a color filter array of the color filters arranged on the color imaging element and filter coefficients of the weighted average filters applied to the color filter array.

As shown in FIG. 7, in the color filter array of the color imaging element of the second embodiment, a horizontal line includes RGBRGBRGB . . . , the next horizontal line includes GBRGBRGBR . . . , the next horizontal line includes BRGBRGBRG . . . , and this is repeated.

More specifically, the color filter array includes the filters of the colors of R, G, and B (R filters, G filters, and B filters) arranged in a predetermined cycle.

As shown in FIG. 7, the color filter array includes the filters of all colors of R, G, and B arranged in the lines in the horizontal and vertical directions.

In this way, the color filter array of the color imaging element of the second embodiment includes the same features as the features (1) and (2) of the color filter array of the color imaging element 12 in the first embodiment.

Meanwhile, the weighted average filters of the second embodiment applied to the color imaging element have a kernel size of 6×6 as shown in a thick frame of FIG. 7, and filter coefficients shown in FIG. 7 are set.

More specifically, for the filter coefficients of the weighted average filters of the second embodiment, a local area of 6×6 pixels is extracted from the mosaic image obtained from the color imaging element of the second embodiment. The filter coefficients of each color are extracted corresponding to the colors of the pixels in the local area, and the sums of the filter coefficients of each color are calculated. The filter coefficients are set so that the proportions of the sums of the filter coefficients of each color of RGB in the lines in the horizontal vertical directions are equal (1:1:1).

For example, the filter coefficients of the uppermost row are 0, 1, 2, 2, 1, and 0 in FIG. 7. It can be recognized that the sums of the colors are R=0+2=2, G=1+1=2, and B=2+0=2, and the sums are in a relationship of 2:2:2=1:1:1. The relationship holds true for all rows and columns (lines in the horizontal and vertical directions) in the filter coefficients.

The filter coefficients are weighted in the weighted average filters so that when the filter coefficients are compared in each area divided into the size of 2×2, the filter coefficient of 2×2 at the center section is the largest, the vertical and horizontal filter coefficients of 2×2 across the center section are the next largest, and the filter coefficients of 2×2 at the four corners are the smallest.

The filter coefficients are set in the weighted average filters so that the filter coefficients are horizontally symmetric, vertically symmetric, and point symmetric.

When weighted average values of RGB are calculated based on the weighted average filters with the configuration described above and based on the pixel values of the pixels in the local area of 6×6 pixels extracted from the mosaic image, color deviation does not occur in the colors based on the weighted average values of RGB regardless of the type of the frequency input in the horizontal and vertical directions, and coloring due to the folding of the high frequency wave does not occur.

As in the first embodiment, the weighted average values of RGB are calculated based on the pixel values of the pixels in the local area of 6×6 pixels extracted from the mosaic image and the filter coefficients of the weighted average filters. The pixel values of the target pixels of 2×2 pixels at the center section in the local area of 6×6 pixels can be interpolated based on the color ratio or the color difference between the calculated weighted average values of RGB to calculate the pixel values of the other colors.

When the demosaicing processing for calculating the pixel values of RGB is finished for all pixels of 2×2 pixels at the center section in the local area of 6×6 pixels, the same process is applied while shifting the local area extracted from the mosaic image by two pixels in the horizontal or vertical direction. In this case, the same weighted average filters can be used.

{Third Embodiment of Color Imaging Element and Weighted Average Filters}

Figure 8:
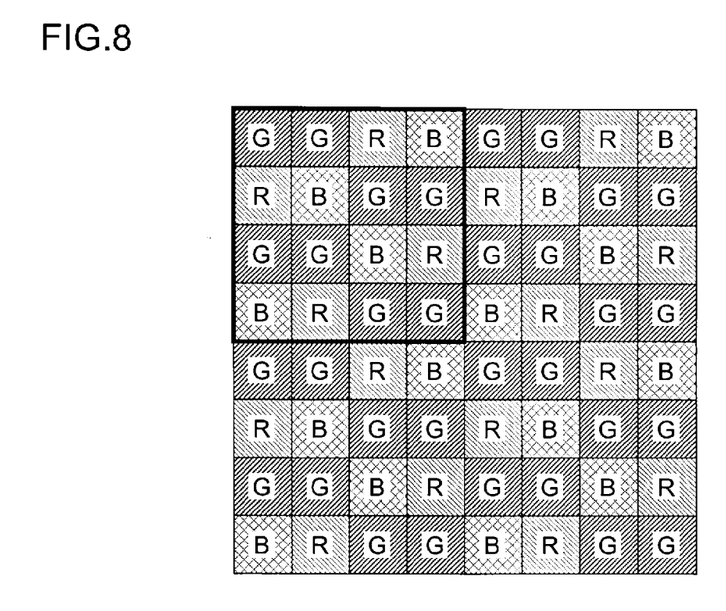
FIG. 8 is a diagram showing a third embodiment of the color imaging element applied to the present invention.

FIG. 8 is a diagram showing a third embodiment of the color imaging element applied to the present invention. FIG. 8 particularly shows a color filter array of the color filters arranged on the color imaging element.

Figure 9A:
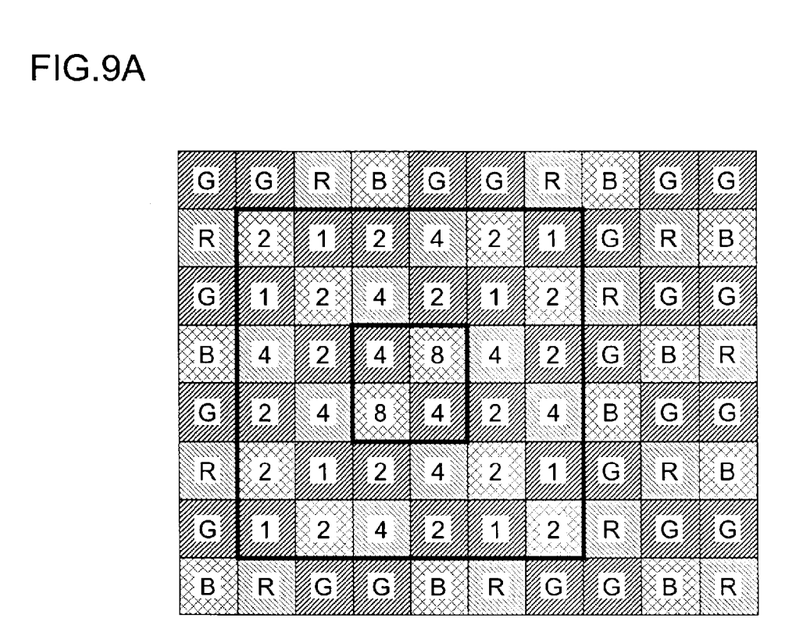
FIG. 9A is a diagram showing a third embodiment of the weighted average filters applied to the color imaging element of the third embodiment.
Figure 9B:
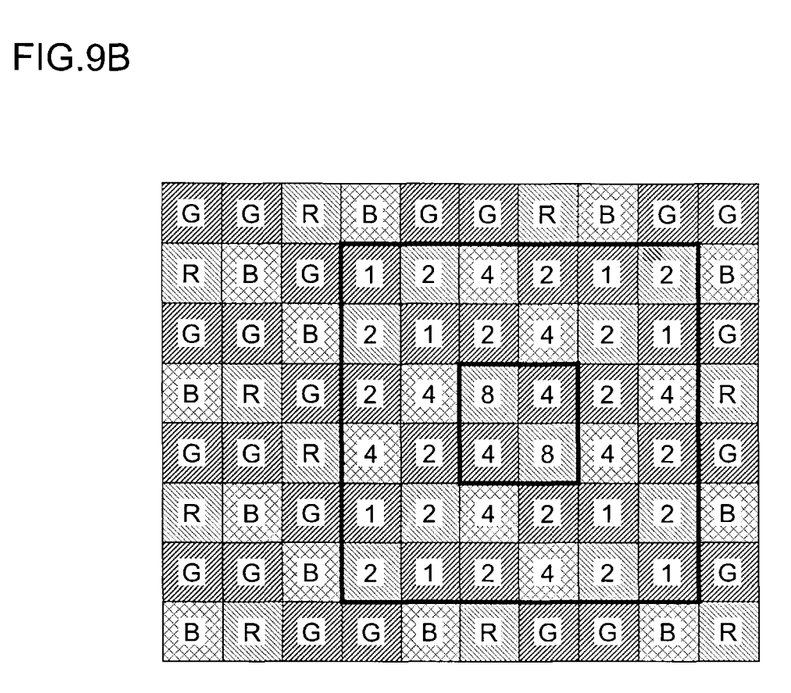
FIG. 9B is a diagram showing weighted average filters applied when a local area of 6×6 pixels shown in FIG. 9A is moved by two pixels in the horizontal direction.

FIG. 9 shows filer coefficients of weighted average filters applied to the color imaging element.

As shown in FIG. 8, the color filter array of the color imaging element of the third embodiment includes a basic array pattern (pattern indicated by a thick frame) formed by a square array pattern corresponding to 4×4 pixels, and the basic array pattern is repeatedly arranged in the horizontal and vertical directions. Therefore, the color filter array includes filters of R, G, and B colors (R filters, G filters, and B filters) arranged in a predetermined cycle.

The color filter array includes the filters of all colors of R, G, and B arranged in the lines of the horizontal and vertical directions.

The basic array pattern of the color filter array is point symmetric with respect to the center of the basic array pattern.

Furthermore, in the basic array pattern of the color filter array shown in FIG. 8, the numbers of pixels of the R pixels, the G pixels, and the B pixels corresponding to the R, G, and B filters in the basic array pattern are four pixels, eight pixels, and four pixels, respectively. More specifically, the ratio of the numbers of pixels of the RGB pixels is 1:2:1, and the proportion of the number of pixels of the G pixels that most contribute to obtaining the luminance signals is greater than the proportions of the numbers of pixels of the R and B pixels of the other colors.

In this way, the color filter array of the color imaging element of the third embodiment has the same features as the features (1), (2), (3), and (4) of the color filter array of the color imaging element 12 of the first embodiment.

Meanwhile, the weighted average filters of the third embodiment applied to the color imaging element has the kernel size of 6×6 as shown by thick frames of FIGS. 9A and 9B, and filter coefficients shown in FIGS. 9A and 9B are set.

More specifically, for the filter coefficients of the weighted average filters of the third embodiment, a local area of 6×6 pixels is extracted from the mosaic image obtained from the color imaging element of the third embodiment. The filter coefficients of each color are extracted corresponding to the colors of the pixels in the local area, and the sums of the filter coefficients of each color are calculated. The filter coefficients are set so that the proportions of the sums of the filter coefficients of each color of RGB in the lines in the horizontal vertical directions are equal (1:1:1).

For example, the filter coefficients of the uppermost row are 2, 1, 2, 4, 2, and 1 in FIG. 9A. It can be recognized that the sums of the colors are R=4, G=1+2+1=4, and B=2+2=4, and the sums are in a relationship of 4:4:4=1:1:1. The relationship holds true for all rows and columns (lines in the horizontal and vertical directions) in the filter coefficients.

The filter coefficients are weighted in the weighted average filters so that when the filter coefficients are compared in each area divided into the size of 2×2, the filter coefficient of 2×2 at the center section is the largest, the vertical and horizontal filter coefficients of 2×2 across the center section are the next largest, and the filter coefficients of 2×2 at the four corners are the smallest.

When weighted average values of RGB are calculated based on the weighted average filters with the configuration described above and based on the pixel values of the pixels in the local area of 6×6 pixels extracted from the mosaic image, color deviation does not occur in the colors based on the weighted average values of RGB regardless of the type of the frequency input in the horizontal and vertical directions, and coloring due to the folding of the high frequency wave does not occur.

As in the first embodiment, the weighted average values of RGB are calculated based on the pixel values of the pixels in the local area of 6×6 pixels extracted from the mosaic image and the filter coefficients of the weighted average filters. The pixel values of the target pixels of 2×2 pixels at the center section in the local area of 6×6 pixels can be interpolated based on the color ratio or the color difference between the calculated weighted average values of RGB to calculate the pixel values of the other colors.

When the demosaicing processing for calculating the pixel values of RGB is finished for all pixels of 2×2 pixels at the center section in the local area of 6×6 pixels, the same process is applied while shifting the local area extracted from the mosaic image by two pixels in the horizontal or vertical direction. In this case, different weighted average filters are used.

More specifically, when there are G pixels at upper left and lower right of the 2×2 pixels at the center section in the local area of the 6×6 pixels extracted from the mosaic image as shown in FIG. 9A, the weighted average filters with the filter coefficients shown in FIG. 9A are used. When the local area extracted from the mosaic image is shifted by two pixels in the horizontal direction as shown in FIG. 9B, and there are G pixels at upper right and lower left of the 2×2 pixels at the center section of the local area, the weighted average filters with the filter coefficients shown in FIG. 9B are used.

{Others}

Although the color imaging apparatus including the color imaging element with color filters of three primary colors of RGB has been described in the embodiments, the present invention is not limited to this. The present invention can also be applied to a color imaging apparatus including a color imaging element with color filters of four colors including three primary colors of RGB and another color (for example, emerald (E)).

The present invention can also be applied to a color imaging apparatus including a color imaging element with color filters of four complementary colors including G in addition to C (cyan), M (magenta), and Y (yellow) that are complementary colors of the primary colors RGB.

It is obvious that the present invention is not limited to the embodiments, and various modifications can be made without departing from the spirit of the present invention.

REFERENCE SIGNS LIST

10 . . . imaging optical system, 12 . . . color imaging element, 14 . . . image processing unit, 16 . . . image processing unit, 18 . . . drive unit, 20 . . . control unit

The invention claimed is:

1. A color imaging apparatus comprising:
a single-plate color imaging element including color filters arranged on a plurality of pixels formed by photoelectric conversion elements arranged in horizontal and vertical directions, the color filters having a color filter array where all colors are periodically arranged in each line in the horizontal and vertical directions;
an image acquisition unit that acquires a mosaic image from the color imaging element;
weighted average filters with predetermined filter coefficients, wherein a relationship between the colors of the pixels and the filter coefficients in a local area extracted from the mosaic image corresponding to the weighted average filters is set so that proportions of sums of the filter coefficients of each color in the lines in the horizontal and vertical directions are equal;
a weighted average calculation unit that calculates weighted average values of each color based on the filter coefficients of the weighted average filters and pixel values of the pixels in the local area extracted from the mosaic image corresponding to the weighted average filters;
a demosaicing processing unit that calculates a pixel value of another color at a pixel position of a target pixel of demosaicing processing at a center section of the weighted average filters and that interpolates a pixel value of the target pixel based on a color ratio or a color difference between the calculated weighted average values of the color and the another color of the target pixel to calculate the pixel value of the another color; and
a control unit that repeatedly operates the weighted average calculation unit and the demosaicing processing unit while shifting the local area extracted from the mosaic image corresponding to the weighted average filters by a target pixel unit of the demosaicing processing.

2. The color imaging apparatus according to claim 1, wherein
the color filter array of the color imaging element includes a basic array pattern including first filters corresponding to a first color that most contributes to obtaining luminance signals and second filters corresponding to two or more second colors other than the first color, the basic array pattern is repeatedly arranged in the horizontal and vertical directions, and
a proportion of the number of pixels of the first color corresponding to the first filters and proportions of the numbers of pixels of each color of the second colors corresponding to the second filters are different.

3. The color imaging apparatus according to claim 2, wherein
the proportion of the number of pixels of the first color corresponding to the first filters is greater than the proportions of the numbers of pixels of each color of the second colors corresponding to the second filters.

4. The color imaging apparatus according to claim 3, wherein
the color filters include R filters, G filters, and B filters corresponding to colors of red (R), green (G), and blue (B) arranged in a predetermined color filter array, wherein
when the weighted average values of each color of the pixel values of R, G, and B pixels corresponding to the R filters, the G filters, and the B filters calculated by the weighted average calculation unit are Rf, Gf, and Bf, respectively,
if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

5. The color imaging apparatus according to claim 4, wherein
the color filters include R filters, G filters, and B filters corresponding to colors of red (R), green (G), and blue (B) arranged in a predetermined color filter array,
the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions,
the weight average filters have a kernel size of 9×9, and
the control unit repeatedly operates the weighted average calculation unit and the demosaicing processing unit while sequentially shifting the weighted average filter to set one of the first and second arrays at the center.

6. The color imaging apparatus according to claim 3, wherein
the color filters include R filters, G filters, and B filters corresponding to colors of red (R), green (G), and blue (B) arranged in a predetermined color filter array,
the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions,
the weight average filters have a kernel size of 9×9, and
the control unit repeatedly operates the weighted average calculation unit and the demosaicing processing unit while sequentially shifting the weighted average filter to set one of the first and second arrays at the center.

7. The color imaging apparatus according to claim 2, wherein
the color filters include R filters, G filters, and B filters corresponding to colors of red (R), green (G), and blue (B) arranged in a predetermined color filter array, wherein
when the weighted average values of each color of the pixel values of R, G, and B pixels corresponding to the R filters, the G filters, and the B filters calculated by the weighted average calculation unit are Rf, Gf, and Bf, respectively,
if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

8. The color imaging apparatus according to claim 7, wherein
the color filters include R filters, G filters, and B filters corresponding to colors of red (R), green (G), and blue (B) arranged in a predetermined color filter array,
the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions,
the weight average filters have a kernel size of 9×9, and
the control unit repeatedly operates the weighted average calculation unit and the demosaicing processing unit while sequentially shifting the weighted average filter to set one of the first and second arrays at the center.

9. The color imaging apparatus according to claim 2, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

10. The color imaging apparatus according to claim 1, wherein the weighted average filters are filters weighted to increase the filter coefficients at the center section.

11. The color imaging apparatus according to claim 4, wherein the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

12. The color imaging apparatus according to claim 10, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

13. The color imaging apparatus according to claim 1, wherein the weighted average filters have the filter coefficients that are horizontally symmetric, vertically symmetric, and point symmetric.

14. The color imaging apparatus according to claim 13, wherein the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

15. The color imaging apparatus according to claim 13, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

16. The color imaging apparatus according to claim 1, wherein the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G\times(Rf/Gf)$ and $B=G\times(Bf/Gf)$, wherein if the target pixel of the demosaicing processing is an R pixel, and the pixel value is R, the demosaicing processing unit calculates pixel values G and B of the G and B pixels at the position of the target pixel by the following formulas $G=R\times(Gf/Rf)$ and $B=R\times(Bf/Rf)$, wherein if the target pixel of the demosaicing processing is a B pixel, and the pixel value is B, the demosaicing processing unit calculates pixel values G and R of the G and R pixels at the position of the target pixel by the following formulas $G=B\times(Gf/Bf)$ and $R=B\times(Rf/Bf)$.

17. The color imaging apparatus according to claim 16, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

18. The color imaging apparatus according to claim 1, wherein the color filters include R filters, G filters, and B filters corresponding to colors of red (R), green (G), and blue (B) arranged in a predetermined color filter array, wherein when the weighted average values of each color of the pixel values of R, G, and B pixels corresponding to the R filters, the G filters, and the B filters calculated by the weighted average calculation unit are Rf, Gf, and Bf, respectively, if the target pixel of the demosaicing processing is a G pixel, and the pixel value is G, the demosaicing processing unit calculates pixel values R and B of the R and B pixels at the position of the target pixel by the following formulas $R=G+(Rf-Gf)$ and $B=G+(Bf-Gf)$, wherein if the target pixel of the demosaicing processing is an R pixel, and the pixel value is R, the demosaicing processing unit calculates pixel values G and B of the G and B pixels at the position of the target pixel by the following formulas $G=R+(Gf-Rf)$ and $B=R+(Bf-Rf)$, wherein if the target pixel of the demosaicing processing is a B pixel, and the pixel value is B, the demosaicing processing unit calculates pixel values G and R of the G and R pixels at the position of the target pixel by the following formulas $G=B+(Gf-Bf)$ and $R=B+(Rf-Bf)$.

19. The color imaging apparatus according to claim 18, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and the control unit repeatedly operates the weighted average calculation unit and the demosaicing processing unit while sequentially shifting the weighted average filter to set one of the first and second arrays at the center.

20. The color imaging apparatus according to claim 1, wherein the color filters include R filters, G filters, and B filters corresponding to colors of red (R), green (G), and blue (B) arranged in a predetermined color filter array, the filter array includes: a first array corresponding to 3×3 pixels, the first array including G filters arranged at a center and four corners, B filters vertically arranged across the G filter at the center, and R filters horizontally arranged across the G filter at the center; and a second array corresponding to 3×3 pixels, the second array including G filters arranged at a center and four corners, R filters vertically arranged across the G filter at the center, and B filters horizontally arranged across the G filter at the center, wherein the first and second arrays are alternately arranged in the horizontal and vertical directions, the weight average filters have a kernel size of 9×9, and
the control unit repeatedly operates the weighted average calculation unit and the demosaicing processing unit while sequentially shifting the weighted average filter to set one of the first and second arrays at the center.

* * * * *